United States Patent [19]

Vasquez

[11] Patent Number: 5,184,889
[45] Date of Patent: Feb. 9, 1993

[54] EARTHQUAKE INDICATOR LIGHT APPARATUS

[76] Inventor: Richard Vasquez, 238 5th St. Apt 1, Montebello, Calif. 90640

[21] Appl. No.: 842,543

[22] Filed: Feb. 27, 1992

[51] Int. Cl.⁵ .............................................. F21V 33/00
[52] U.S. Cl. .................................... 362/276; 362/802
[58] Field of Search ............................... 362/276, 802

[56] References Cited

U.S. PATENT DOCUMENTS 5,029,205  7/1991  Archer .......................... 362/802 X Primary Examiner—Allen M. Ostrager
Attorney, Agent, or Firm—Leon Gilden

[57] ABSTRACT

An indicator light is arranged for actuation upon vibration imparted to the light housing. A mercury switch cooperates with a first switch to effect actuation of the light, with the mercury switch arranged for effecting contact. Further, the housing is arranged to include a pin member displaced within the housing upon vibration being imparted to the housing and pin member.

2 Claims, 4 Drawing Sheets

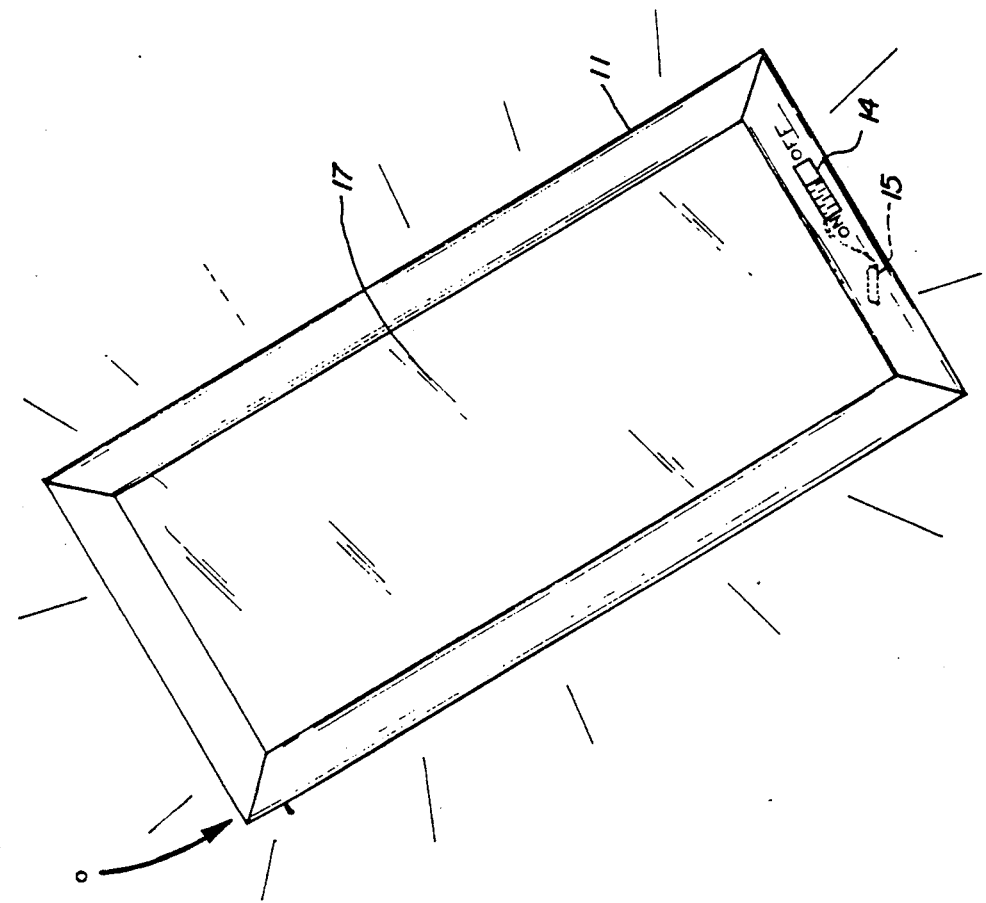
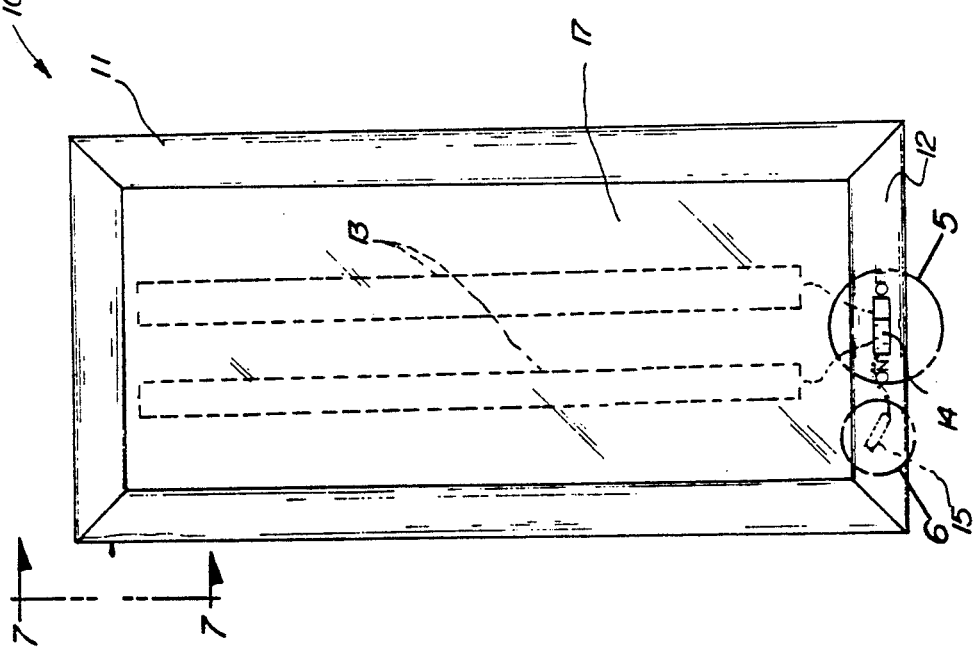

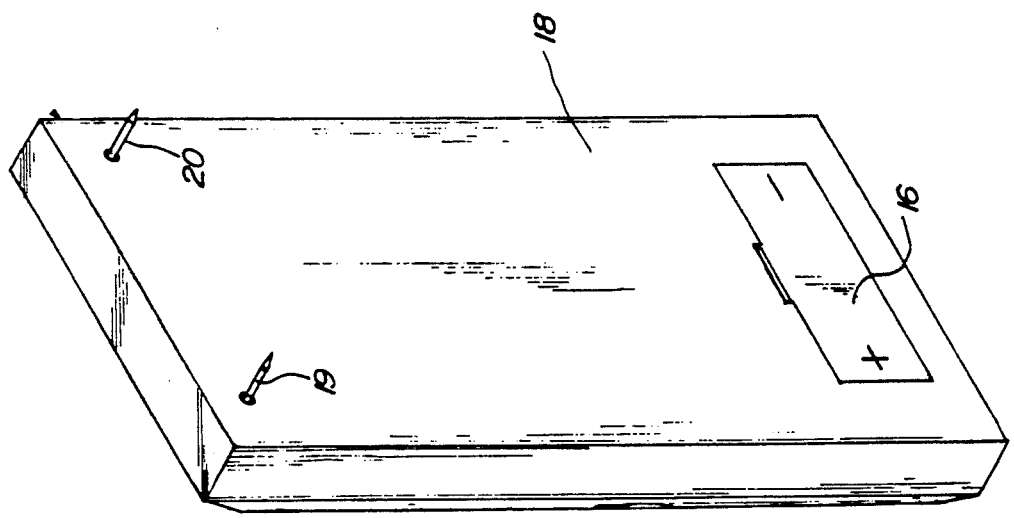
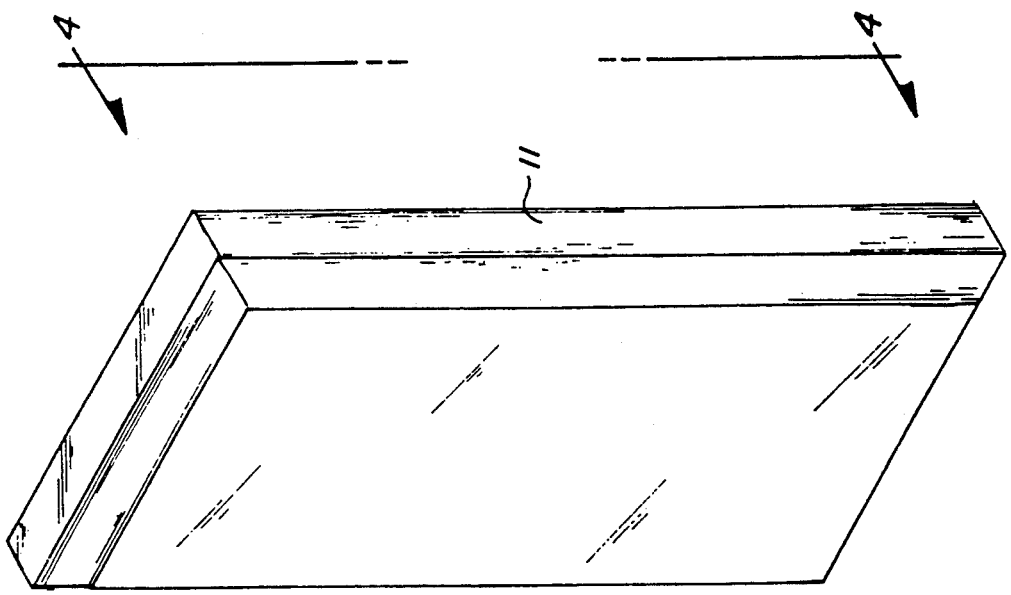

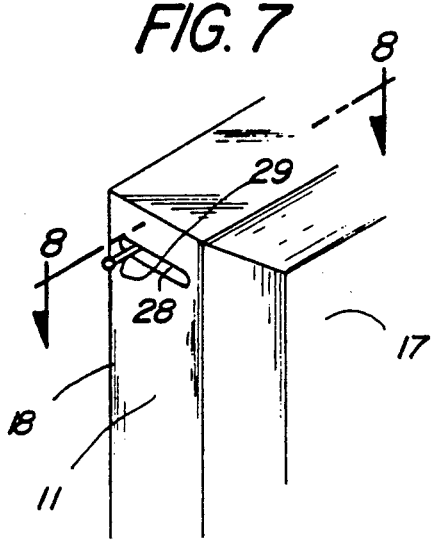
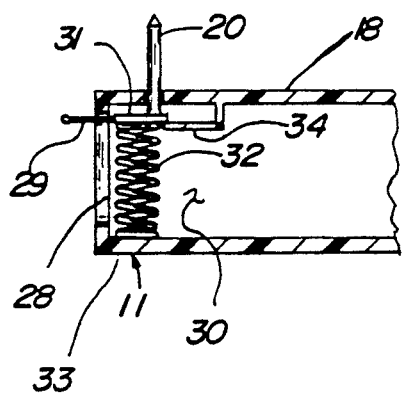
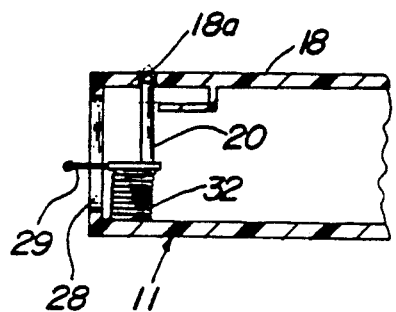

EARTHQUAKE INDICATOR LIGHT APPARATUS

BACKGROUND OF THE INVENTION

1. Field of the Invention

The field of invention relates to indicator apparatus, and more particularly pertains to a new and improved earthquake indicator light apparatus wherein the same is arranged to effect automatic actuation upon detection of vibration such as imparted by earthquake phenomenon.

2. Description of the Prior Art

During earthquake situations, electrical power is frequently curtailed to earthquake areas, wherein recourse to emergency lighting is required but during conditions of limited available light, access to such emergency material is frequently unavailable. The instant invention attempts to address deficiencies of the prior art by providing for a light member arranged for effecting instantaneous actuation upon earthquake situations. The prior art has provided for lighting apparatus such as in U.S. Pat. No. 4,894,601 to Watkins to effect for lighting upon low voltage to a primary power source.

U.S. Pat. No. 4,893,224 to Tinley sets forth an emergency lighting structure for mounting within various stair wells and the like for use by battery power.

U.S. Pat. No. 4,887,004 to Kraaij, et al. sets forth a further example of an emergency lighting apparatus to effect actuation upon low voltage being imparted to the circuit.

U.S. Pat. No. 4,945,280 to Beghelli sets forth independent lighting structure utilizing self-diagnosis circuitry.

As such, it may be appreciated that there continues to be a need for a new and improved earthquake indicator light apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of indicator light apparatus now present in the prior art, the present invention provides an earthquake indicator light apparatus wherein the same is arranged for actuation upon vibration such as by earthquake being directed to the lighting structure. As such, the general purpose of the present invention, which will be described subsequently in greater detail, is to provide a new and improved earthquake indicator light apparatus which has all the advantages of the prior art indicator light apparatus and none of the disadvantages.

To attain this, the present invention provides an indicator light arranged for actuation upon vibration imparted to the light housing. A mercury switch cooperates with a first switch to effect actuation of the light, with the mercury switch arranged for effecting contact. Further, the housing is arranged to include a pin member displaced within the housing upon vibration being imparted to the housing and pin member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved earthquake indicator light apparatus which has all the advantages of the prior art indicator light apparatus and none of the disadvantages.

It is another object of the present invention to provide a new and improved earthquake indicator light apparatus which may be easily and efficiently manufactured and marketed.

It is a further object of the present invention to provide a new and improved earthquake indicator light apparatus which is of a durable and reliable construction.

An even further object of the present invention is to provide a new and improved earthquake indicator light apparatus which is susceptible of a low cost of manufacture with regard to both materials and labor, and which accordingly is then susceptible of low prices of sale to the consuming public, thereby making such earthquake indicator light apparatus economically available to the buying public.

Still yet another object of the present invention is to provide a new and improved earthquake indicator light apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic front view of the invention in a first position.

FIG. 2 is an orthographic view of the housing structure in a second position.

FIG. 3 is an isometric illustration of the instant invention.

FIG. 4 is a rear isometric illustration of the invention, taken along the lines 4—4 of FIG. 3 in the direction indicated by the arrows.

FIG. 7 is an isometric illustration of the housing and associated reset pin utilized by the invention.

FIG. 8 is an orthographic view, taken along the lines 8—8 of FIG. 7 in the direction indicated by the arrows, illustrating the second securement pin a first position projecting from a rear wall of the housing.

FIG. 9 is an orthographic view of the second pin in a second retracted position within the housing.

DESCRIPTION OF THE PREFERRED EMBODIMENT

Figure 5:
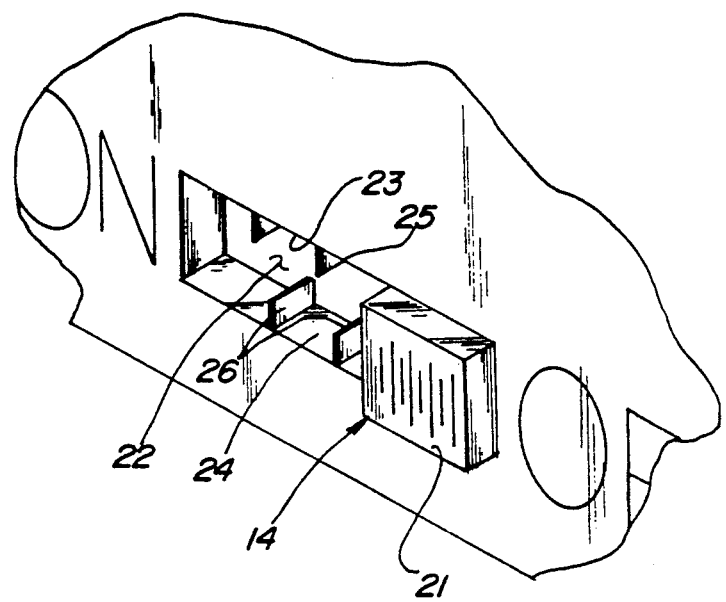
FIG. 5 is an enlarged isometric illustration of the first switch member.
Figure 6:
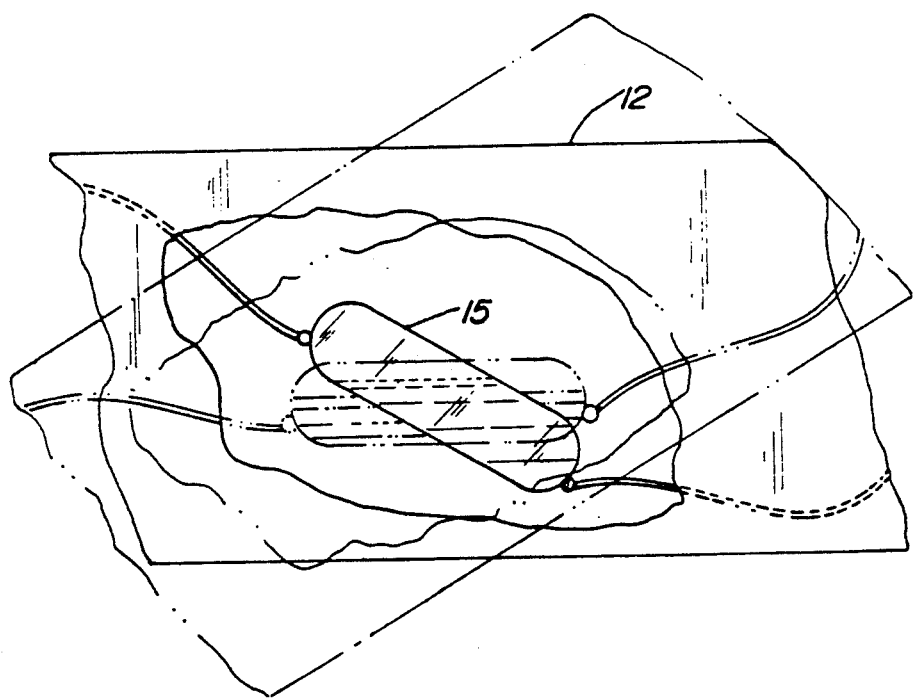
FIG. 6 is an orthographic view of the mercury switch structure utilized by the invention.

With reference now to the drawings, and in particular to FIGS. 1 to 9 thereof, a new and improved earthquake indicator light apparatus embodying the principles and concepts of the present invention and generally designated by the reference numeral 10 will be described.

More specifically, the earthquake indicator light apparatus 10 of the instant invention essentially comprises a housing 11 positioned in surrounding relationship relative to a central lens 17. A bottom leg of the housing 11 includes an on/off first switch 14 in electrical communication with a fluid mercury second switch 15 containing fluid mercury within a vial structure. A battery compartment 16 (see FIG. 4) includes batteries in electrical communication with the first and second switches 14 and 15 and associated illumination bulb 13 positioned within the housing rearwardly of the central lens 17 utilizing conventional D.C. circuitry. Upon vibration imparted to the housing with the housing being mounted in a vertically oriented manner as set forth in FIG. 1 such as to a wall 11, the housing is displaced from a first vertical orientation, as illustrated in FIG. 1, to a second displaced orientation, as set forth in FIG. 2, to effect the mercury switch 15 to provide for electrical communication between the first switch 14 when positioned in an on position and the illumination bulbs 13 and the batteries within an associated battery compartment 16. The housing includes a housing rear wall 18, with a first securement pin 19 fixedly and orthogonally mounted to the rear wall adjacent a right side of the housing, with a second securement pin 20 reciprocatably mounted relative to the housing rear wall 18 adjacent a left side wall of the housing 11. The second pin 20 is reciprocatably mounted within a housing rear wall bore 18a (see FIG. 9) to permit retraction of the second pin within an associated second pin housing cavity 30 within the housing 11. The housing left side wall 27 includes a left side wall slot 28 receiving a reset pin 29 projecting orthogonally relative to the side wall 27 from the second pin housing cavity 30. The second pin 20 includes a second pin base 31 positioned within the cavity 30 that is orthogonally oriented relative to the pin, with the reset pin 29 fixedly mounted to the base 31, whereupon reciprocation of the pin 29 from a housing forward wall 33 to the rear wall 18 effects projection of the pin 20 to the first position, as illustrated in FIG. 8. A tension spring 32 fixedly mounted within the housing cavity 30 between the forward wall 33 and the rear wall 18 biases the second pin 20 to the second position within the housing cavity, as illustrated in FIG. 9, wherein a detent leg 34 of a flexible shape retentent material projects from an interior surface of the rear wall 18 to a rear surface of the base 31 extending from a position exteriorly of the base 31 to position adjacent the outer edge of the base 31, whereupon vibration to the pin 20 deflects the base relative to the detent leg 34 permitting the tension spring 32 to retract the second pin 20 to the second position.

Further, the first switch 14 includes a first switch slide 21 (see FIG. 5), with the slide 21 slidably mounted within a slot 22. The slide includes a slot top wall 23 spaced from a slot bottom wall 24, including respective top and bottom wall resilient pins 25 and 26 to maintain orientation of the slide 21 to an on or off position adjacent opposed distal ends of the slide to prevent the switch from inadvertently being oriented towards an off position during earthquake and maintain the desired setting of the switch within the slot 22.

As illustrated, displacement of the second pin 20 to the second position effects displacement of the housing 11 to a housing second position, as illustrated in FIG. 2, actuating the mercury switch 15 or second switch to effect illumination of the illumination bulbs 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows;

1. An earthquake indicator light apparatus, comprising, a housing, the housing including a
   central lens mounted within the housing, and
   at least one illumination bulb mounted within the housing rearwardly of the central lens, and
   the housing including a first switch, and battery means for providing electrical energy, and second switch means for directing electrical energy from the battery means through the first switch to the illumination bulb upon displacement of the housing from a first vertical orientation to a second angular orientation relative to the first orientation, and
   the second switch means includes a mercury filled vial in electrical communication between the first switch, the battery means, and the illumination bulb, and
   the first switch includes a first switch slot, and a first switch slide slidably mounted within the first switch slot, the slot includes a first end and a second end, and the slide displaceable from the first end to the second end for permitting opening and closing of the first switch, and the slide including a top wall spaced from a bottom wall, the top wall including a plurality of top wall resilient fins, the bottom wall including a plurality of bottom wall resilient fins to orient the slide in a predetermined orientation within the slot, and the housing includes a housing rear wall, a housing right side wall, and a housing left side wall, the housing rear wall includes a first pin orthogonally and fixedly mounted to the housing rear wall adjacent the right side wall, and a second pin reciprocatably mounted relative to the housing projecting through the housing rear wall adjacent the left side wall, the second pin reciprocatably mounted within a rear wall bore directed through the rear wall, and the housing including a housing cavity positioned within the housing rearwardly of the second pin, and the second pin including a second pin base positioned within the cavity, the base including a reset pin fixedly mounted to the base, with the reset pin orthogonally oriented relative to the second pin, and the left side wall including a left side wall slot, with the reset pin projecting through the left side wall slot permitting reciprocation of the second pin relative to the housing.

2. An apparatus as set forth in claim 1 wherein the second pin base includes a tension spring fixedly mounted to the base, with the tension spring including a tension spring rear distal end, the tension spring rear distal end fixedly mounted to the housing within the housing cavity, and the housing including a forward wall, with the tension spring rear distal end fixedly mounted to the housing forward wall spaced from the housing rear wall to bias the second pin within the cavity, and a detent leg formed of a flexible shape retentent material fixedly mounted to the housing rear wall spaced from the housing forward wall, with the detent leg including a leg projection oriented for engagement adjacent an outer edge of the second pin base, with the detent leg displaced upon vibration imparted to the second pin to withdraw the second pin within the housing cavity.

* * * * *